United States Patent Office 3,344,159
Patented Sept. 26, 1967

3,344,159
4,8,14-TRIMETHYL-11-OXYGENATED-18-NOR-ANDROST-4-EN-3,17-DIONE
Patrick A. Diassi, Westfield, and Pacifico A. Principe, South River, N.J., assignors to E. R. Squibb & Sons, Inc., New York, N.Y., a corporation of Delaware
No Drawing. Filed Nov. 12, 1965, Ser. No. 507,532
4 Claims. (Cl. 260—397.45)

This invention relates to and has as its object the provision of novel physiologically active steroids and methods for their production.

More particularly, this invention relates to the production of compounds of the formula

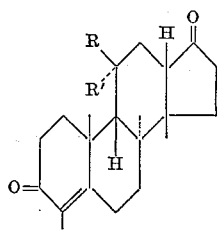

R is hydrogen; R' is selected from the group consisting of hydroxy and acyloxy.

The preferred acyloxy radicals are those of hydrocarbon carboxylic acids of less than twelve carbon atoms, as exemplified by the lower alkanoic acids (e.g. acetic, propionic, butyric and tert-pentanoic acid), the lower alkenoic acids, the monocyclic aryl carboxylic acids (e.g., benzoic and toluic acid), the monocyclic aryl lower alkanoic acids (e.g., phenacetic and β-phenylpropionic acid), the cycloalkane carboxylic acids and the cycloalkene carboxylic acids.

The compounds of the instant invention are physiologically active steroids which possess anti-androgenic activity, i.e., they inhibit the action of androgens, and they may be used in the treatment of such conditions as hyperandrogenic acne. The compounds of this invention are also useful as anabolic, anti-estrogenic or androgen agents. The compounds may be formulated for such administration, the concentration and/or dosage being based on the activity of the particular compound and the requirements of the patient.

The novel compounds of this invention may be prepared according to the process of this invention by employing as the starting material 4α,8,14-trimethyl-11α-hydroxy-18-nor-5α,8α,9β,14β-androstane-3,17-dione. The preparation of this starting material is disclosed in U.S. patent application Ser. No. 455,002, filed May 11, 1965.

The novel compounds of the instant invention may be prepared from the starting material by subjecting the latter to the action of the enzymes of *Pseudomonas testosteroni* under oxidizing and preferably aerobic conditions. The oxidation can best be effected by either including the starting material in an aerobic culture of the microorganism, or by bringing together, in an aqueous medium, the compounds, air, and enzymes of non-proliferating cells of the microorganism.

In general, the conditions of culturing the microorganism for the purposes of this invention are (except for the inclusion of the starting material to be converted) the same as those of culturing microorganisms for the production of antibiotics, i.e., the microorganism is aerobically grown in contact with (in or on) a suitable fermentation medium. A suitable medium essentially comprises a source of carbon and energy. The latter may be a carbohydrate (such as sucrose, molasses, glucose, maltose, starch, or dextrin), a fatty acid, a fat and/or the compound itself. Preferably, however, the medium includes an assimilable source of carbon and energy in addition to the steroid. Among the fats utilizable for the purpose of this invention are: lard oil, soybean oil, linseed oil, cottonseed oil, peanut oil, coconut oil, corn oil, castor oil, sesame oil, crude palm oil, fancy mutton tallow, sperm oil, olive oil, tristearin, tripalmitin, triolein, and trilaurin. Among the fatty acids utilizable for the purpose of this invention are: stearic acid, palmitic acid, oleic acid, linoleic acid, and myristic acid.

The source of nitrogenous factors may be organic (e.g., soybean meal, corn steep liquor, meat extract and/or distillers solubles) or synthetic (i.e., composed of simple, synthesizable organic or inorganic compounds such as ammonium salts, alkali nitrates, amino acids or urea).

An adequate sterile-air supply should be maintained during fermentation, for example, by the conventional methods of exposing a large surface of the medium to air or by utilizing submerged aerated culture. The compound may be added to the culture during the incubation period, or included in the medium prior to sterilization or inoculation. The preferred (but not limiting) range of concentration of the starting material is about 0.01 to 0.10%. The culture period (or rather the time of subjecting the compound to the action of the enzyme) may vary considerably, the range of about six to ninety-six hours being feasible, but not limiting.

The process yields, inter alia, 4α,8,14-trimethyl-11α-hydroxy - 18 - nor-8α,9β,14β-androst-4-en-3,17-dione. This product can be esterified in the usual manner, as by treatment with the desired acid anhydride or acyl halide in an organic solvent (preferably in an organic base such as pyridine) to yield the 11α-ester derivative.

The following examples are illustrative of the invention:

*Example 1.—4α,8,14-trimethyl-11α-hydroxy-18-nor-8α,9β,14β-androst-4-en-3,17-dione*

(A) *Fermentation.*—Surface growth from each of 4 two-week-old agar slants of *Pseudomonas testosteroni* (ATCC American Type Culture Collection No. 11996), the slants containing as a nutrient medium (A):

|  | Grams |
|---|---|
| Glucose | 10 |
| Yeast extract | 2.5 |
| $K_2HPO_4$ | 1 |
| Agar | 20 |

Distilled water to 1 liter.

is suspended in 5 ml. of 0.01% aqueous sodium lauryl solution. One ml. portions of this suspension are used to inoculate sixteen 250 ml. Erlenmeyer flasks, each containing 50 ml. of the following sterilized medium (B):

|  | Grams |
|---|---|
| Beef extract | 1.5 |
| Yeast extract | 3 |
| Peptone | 6 |
| Dextrose | 1 |

Distilled water to 1 liter.

After eighteen hours incubation at 25° C. with continuous rotary agitation (280 cycles/minute; two-inch radius), 5% (v.:1.) transfers are made to one hundred 250 ml. Erlenmeyer flasks, each containing 50 ml. of freshly sterilized medium B. After twenty-four hours of further incubation, using the same conditions described above each flask is supplemented with 200 micrograms/ml. of 4α,8,14-trimethyl-11α-hydroxy-18-nor-5α,8α,9β,14β-androstane-3,17-dione. The steroid is added by supplementing each flask with 0.25 ml. of a sterile solution (40 mg./ml.) of a steroid in N,N-dimethylformamide. A total of 1.0 gm. is fermented. After six days of further incubation, using the same conditions as described above, the contents of the flasks are pooled and the broth is then adjusted to pH 4.0 using 12 N H₂SO₄. The acidified broth is then filtered through a Seitz clarifying pad. The flasks mycelium and pad are washed with successive 50 ml. portions of warm water. The combined filtrate and washings have a volume of 5700 ml.

(B) *Isolation.*—The obtained filtrate is extracted three times with 1900 ml. portions of chloroform which are combined, washed twice with 2 liter portions of water and evaporated, in vacuo. The residue is plate chromatographed on Woelm neutral alumina (Activity V) using chloroform as the developing solvent. Two U.V. absorbing bands are detectable. The more polar band on elution and crystallization gives 4α,8,14-trimethyl-11α-hydroxy-18-nor-8α,9β,14β-androst-4-en-3,17-dione having a melting point about 248–250° C.

$$\tau_{DCCl_3}^{Si(Me)_4}$$

8.20 (s, 4-Me), 8.59 (s, 19-Me), 9.08 and 9.12. The less polar band on elution and crystallization gives 4α,8,14-trimethyl - 18-nor - 8α,9β,14β-androst-4-en-3,11,17-trione having a melting point about 200–202° C.

$$\tau_{CDCl_3}^{Si(Me)_4}$$

8.20 (s, 4-Me), 8.47 (s, 19-Me), 8.63 and 9.17.

*Example 2.—4α,8,14-trimethyl-11α-acetoxy-18-nor-8α,9β,14β-androst-4-en-3,17-dione*

A mixture of 35 mg. of 4α,8,14-trimethyl-11-hydroxy-18-nor-8α,9β,14β-androst-4-en-3,17-dione; 0.25 ml. of acetic anhydride; and 0.5 ml. of pyridine is left at room temperature for four hours, diluted with water and extracted three times with ether. The ether extracts are washed with a saturated sodium bicarbonate solution, 8% salt solution, dried over sodium sulfate and evaporated to dryness. The residue is crystallized from ether-isopropyl ether to give 4α,8,14-trimethyl-11-acetoxy-18-nor-8α,9β,14β-androst-4-en-3,17-dione.

Similarly, by substituting other acylating agents such as propionic anhydride and benzoyl chloride, for the acetic anhydride, the corresponding esters are formed.

While there have been described various embodiments of the invention, the compositions and methods described are not intended to be understood as limiting the scope of the invention, as it is realized that changes therein are possible and it is further intended that each element recited in any of the following claims is to be understood as referring to all equivalent elements for accomplishing substantially the same results in substantially the same or equivalent manner, it covering the invention broadly in whatever form its principle may be utilized.

What is claimed is:

1. A compound having the formula

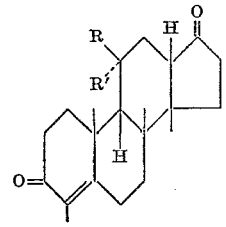

wherein R is hydrogen and R' is selected from the group consisting of hydroxy and acyloxy where the acyl radical is less than 12 carbon atoms.

2. A compound in accordance with claim 1 wherein R' is hydroxy having the name 4,8,14-trimethyl-11α,-hydroxy-18-nor-8α,9β,14β-androst-4-en-3,17-dione.

3. A compound in accordance with claim 1 wherein R' is acyloxy.

4. A compound in accordance with claim 1 having the name 4,8,14-trimethyl-11α-acetoxy - 18 - nor - 8α,9β,14β-androst-4-en-3,17-dione.

References Cited

UNITED STATES PATENTS 3,274,219   9/1966   Krakower _____ 260—397.45

ELBERT L. ROBERTS, *Primary Examiner.*